(12) United States Patent
Valente et al.

(10) Patent No.: US 10,710,454 B2
(45) Date of Patent: Jul. 14, 2020

(54) DISCONNECTABLE AXLE ASSEMBLY HAVING A PLANETARY DIFFERENTIAL

(71) Applicant: AMERICAN AXLE & MANUFACTURING, INC., Detroit, MI (US)

(72) Inventors: Paul J. Valente, Berkley, MI (US); James P. Downs, South Lyon, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 15 days.

(21) Appl. No.: 16/024,937

(22) Filed: Jul. 2, 2018

(65) Prior Publication Data

US 2018/0319277 A1 Nov. 8, 2018

Related U.S. Application Data

(63) Continuation of application No. PCT/US2017/013772, filed on Jan. 17, 2017.

(60) Provisional application No. 62/287,076, filed on Jan. 26, 2016.

(51) Int. Cl.
| | |
|---|---|
| B60K 23/08 | (2006.01) |
| B60K 17/16 | (2006.01) |
| B60K 17/02 | (2006.01) |
| B60B 35/12 | (2006.01) |
| B60K 17/35 | (2006.01) |
| F16D 11/14 | (2006.01) |
| F16D 27/118 | (2006.01) |
| F16H 48/10 | (2012.01) |
| B60B 35/16 | (2006.01) |

(52) U.S. Cl.
CPC ............ *B60K 23/08* (2013.01); *B60B 35/125* (2013.01); *B60K 17/02* (2013.01); *B60K 17/16* (2013.01); *B60K 17/165* (2013.01); *B60K 17/3515* (2013.01); *F16D 11/14* (2013.01); *F16D 27/118* (2013.01); *F16H 48/10* (2013.01); *B60B 35/16* (2013.01); *B60K 2023/0825* (2013.01); *B60K 2023/0858* (2013.01); *B60Y 2400/421* (2013.01); *B60Y 2400/422* (2013.01); *B60Y 2400/73* (2013.01)

(58) Field of Classification Search
CPC ........ B60K 23/08; B60K 17/02; B60K 17/16; F16D 11/14; F16D 27/118; F16H 48/10; F16H 48/11
See application file for complete search history.

(56) References Cited

U.S. PATENT DOCUMENTS

| | | |
|---|---|---|
| 3,195,371 A | 7/1965 | Christie |
| 3,413,873 A | 12/1968 | Bixby |
| 4,207,780 A | 6/1980 | Saxton |

(Continued)

FOREIGN PATENT DOCUMENTS

| | | |
|---|---|---|
| GB | 2004001 A | 3/1979 |

OTHER PUBLICATIONS

Definition of Motor, retrieved from www.merriam-webster.com (Year: 2019).*

(Continued)

*Primary Examiner* — Stacey A Fluhart
(74) *Attorney, Agent, or Firm* — Burris Law, PLLC

(57) ABSTRACT

A disconnecting axle assembly with a planetary differential assembly and a coupling that selectively couples a planet carrier of the planetary differential assembly to an axle shaft.

10 Claims, 3 Drawing Sheets

(56) References Cited

U.S. PATENT DOCUMENTS

| | | | |
|---|---|---|---|
| 4,677,873 A | | 7/1987 | Eastman et al. |
| 4,677,875 A | | 7/1987 | Batchelor |
| 4,704,921 A | * | 11/1987 | Fry .................. F16H 48/10 |
| | | | 475/87 |
| 4,757,727 A | * | 7/1988 | Teraoka ............. B60K 17/3465 |
| | | | 192/93 A |
| 4,967,861 A | | 11/1990 | Oyama et al. |
| 5,156,578 A | * | 10/1992 | Hirota ................ B60K 17/3462 |
| | | | 475/150 |
| 5,322,484 A | * | 6/1994 | Reuter ................. F16D 35/005 |
| | | | 192/21.5 |
| 6,283,379 B1 | | 9/2001 | Kazmierowicz et al. |
| 6,286,379 B1 | | 9/2001 | Yester et al. |
| 8,961,353 B2 | | 2/2015 | Valente et al. |
| 8,986,151 B2 | | 3/2015 | Valente et al. |
| 9,028,358 B2 | | 5/2015 | Valente et al. |
| 9,162,567 B2 | | 10/2015 | Valente et al. |
| 9,302,581 B1 | | 4/2016 | Valente |
| 9,346,354 B2 | | 5/2016 | Valente |
| 9,895,971 B2 | | 2/2018 | Kincaid et al. |
| 2005/0090358 A1 | * | 4/2005 | Phelan .................. F16H 48/10 |
| | | | 475/231 |
| 2010/0062891 A1 | | 3/2010 | Ekonen et al. |
| 2010/0240486 A1 | | 9/2010 | Pritchard et al. |
| 2011/0195812 A1 | * | 8/2011 | Burke ............... B60K 17/3467 |
| | | | 475/204 |
| 2012/0083380 A1 | | 4/2012 | Reed et al. |
| 2013/0324359 A1 | * | 12/2013 | Sasaki ..................... B60K 6/48 |
| | | | 477/5 |
| 2014/0274544 A1 | * | 9/2014 | Downs .................. F16H 48/38 |
| | | | 475/246 |
| 2014/0342866 A1 | * | 11/2014 | Valente .................. F16H 48/08 |
| | | | 475/86 |
| 2015/0119181 A1 | | 4/2015 | Fox |
| 2017/0002875 A1 | * | 1/2017 | Beesley ............... F16D 27/118 |
| 2017/0144540 A1 | | 5/2017 | Kincaid et al. |
| 2018/0029471 A1 | | 2/2018 | Richards et al. |

OTHER PUBLICATIONS

Supplementary European Search Report for corresponding EP 17 74 4690; dated Jul. 16, 2019; 9 pp.

\* cited by examiner

DISCONNECTABLE AXLE ASSEMBLY HAVING A PLANETARY DIFFERENTIAL

CROSS-REFERENCE TO RELATED APPLICATIONS

This application is a bypass continuation application of International Patent Application No. PCT/US2017/013772 filed on Jan. 17, 2017, which claims the benefit of U.S. Provisional Patent Application No. 62/287,076 filed Jan. 26, 2016, the disclosure of which is incorporated by reference as if fully set forth in detail herein.

FIELD

The present disclosure relates to a disconnectable axle assembly having a planetary differential.

BACKGROUND

Modern automotive vehicles employing all-wheel drive or four-wheel drive drivelines frequently employ a disconnecting axle to restrict operation of the driveline so that only a single set of vehicle wheels are driven. Configuration in this manner provides the driveline with increased traction capabilities (i.e., when actively driving all four of the vehicle wheels) as well as fuel economy that approaches a conventional two-wheel drive driveline (i.e., when only two of the vehicle wheels are actively driven). Examples of disconnecting axles are found in U.S. Pat. Nos. 9,199,535 and 9,074,672. While such disconnecting drivelines are well suited for their intended purpose, there remains a need for an axle assembly with a compact, robust and relatively inexpensive disconnect mechanism.

SUMMARY

This section provides a general summary of the disclosure, and is not a comprehensive disclosure of its full scope or all of its features.

In one form, the present teachings provide a disconnecting axle assembly with a planetary differential assembly and a coupling that selectively couples a planet carrier of the planetary differential assembly to an axle shaft.

In another form, the present teachings provide an axle assembly that includes an housing assembly, an input pinion mounted to the housing assembly for rotation about a first axis, a ring gear mounted to the housing assembly for rotation about a second axis that is not parallel to the first axis, a differential assembly, first and second output members and a clutch. The differential assembly has an internal gear, a planet carrier, a plurality of planet gears, and a sun gear. The internal gear is coupled to the ring gear for rotation therewith. The planet carrier has a carrier body and a plurality of carrier pins that are fixedly coupled to the carrier body. Each of the planet gears is journally mounted on a corresponding one of the carrier pins. At least a first portion of the planet gears are meshed with the internal gear, and at least a second portion of the planet gears are meshed with the sun gear. The second output member is coupled to the sun gear for rotation therewith. The clutch is configured to selectively and directly couple the first output member to the carrier body.

According to a further embodiment of the invention, the clutch comprises a coupling member that is axially slidably mounted on the first output member.

According to a further embodiment of the invention, the carrier body has a first set of external teeth, wherein the first output member has a second set of external teeth, and wherein the coupling member has at least one set of internal teeth that are engageable to the first and second sets of external teeth.

According to a further embodiment of the invention, the coupling member is movable along the second axis between a first position, in which the at least one set of internal teeth are engaged to both the first and second sets of external teeth, and a second position in which the at least one set of internal teeth are disengaged from the first set of external teeth.

According to a further embodiment of the invention, wherein the first and second sets of external teeth have respective pitch diameters that are larger than at least one of a) twice a distance between the center of any one of the carrier pins to the second axis; b) twice a distance from the second axis to a center of a rolling bearing element of a bearing that supports the ring gear for rotation on the housing assembly; c) the sun gear; and d) a minimum diameter of the ring gear.

According to a further embodiment of the invention, the first and second sets of external teeth have respective pitch diameters that are sized so that circles defined by the pitch diameters are at least one of: a) closer to a line extending through the centers of each of a plurality of bearing balls of a first bearing that support the input pinion than to the second axis; b) farther from the second axis than any portion of a second bearing that supports the ring gear for rotation relative to the housing assembly; c) farther from the second axis than any portion of a third bearing that supports the input pinion on a side of a pinion gear that is opposite the first bearing; and d) in a plane that is perpendicular to and intersects the first axis within a zone in which the teeth of the pinion gear mesh with the teeth of the ring gear.

According to a further embodiment of the invention, the at least one set of internal teeth is engaged to the second set of external teeth when the coupling member is in the second position.

According to a further embodiment of the invention, the axle assembly includes a spring that biases the coupling member toward the first position.

According to a further embodiment of the invention, the axle assembly includes a linear motor that is selectively operable for translating the coupling member in at least one direction along the second axis. Optionally, the linear motor comprises an electromagnet.

According to a further embodiment of the invention, the axle assembly includes a thrust bearing disposed between and contacting the first output member and the carrier body.

According to a further embodiment of the invention, at least one of the input pinion and the ring gear is supported for rotation relative to the housing assembly via a four-point angular contact bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
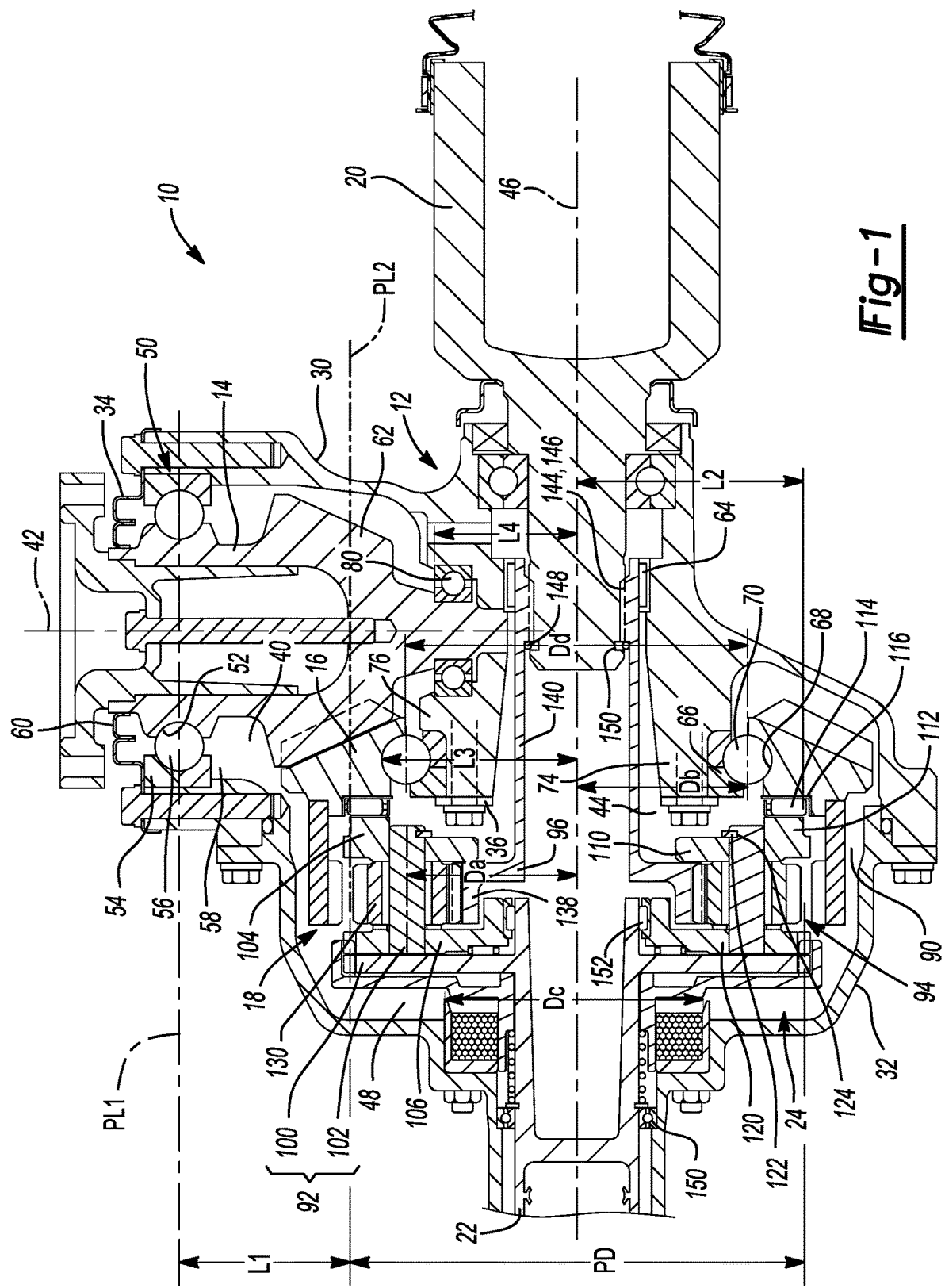
FIG. 1 is a section view of an exemplary disconnectable front axle assembly constructed in accordance with the teachings of the present disclosure.

With reference to FIG. 1 of the drawings, an exemplary axle assembly constructed in accordance with the teachings of the present disclosure is generally indicated by reference numeral 10. In the particular example provided, the axle assembly 10 is an independent front axle assembly having disconnecting capabilities, but it will be appreciated that the teachings of the present disclosure have application to various other types of axle assemblies and as such, the particular example illustrated and described herein is not intended to limit the scope of the disclosure in any way. The axle assembly 10 can include a housing assembly 12, an input pinion 14, a ring gear 16, a differential assembly 18, a first output member or axle shaft 20, a second output member or axle shaft 22 and a clutch or coupling 24.

The housing assembly 12 can be configured to house the input pinion 14, the ring gear 16, the differential assembly 18, and the coupling 24. The housing assembly 12 can include a first housing member 30, a second housing member 32, a seal mount 34 and an annular bearing mount 36. The first housing member 30 can define a first cavity 40, which can be disposed about a first axis 42, and a second cavity 44 that can be disposed about a second axis 46. The first cavity 40 can be configured to receive the input pinion 14 therein, while the second cavity 44 can be configured to receive the ring gear 16 therein. The second housing member 32 can define a third cavity 48, which can be configured to receive the differential assembly 18 and the coupling 24 therein. The second housing member 32 is configured to be separable from the first housing member 30 along the second axis 46.

The input pinion 14 can be received in the first cavity 40 and can be supported for rotation about the first axis 42 by a first bearing 50 that is configured to transmit axial loads between the input pinion 14 and the housing assembly 12 in two (i.e., opposite) directions along the first axis 42. Accordingly, it will be appreciated that axial loads transmitted through the input pinion 14 are handled at least substantially (if not completely) by the first bearing 50. In the example provided, the first bearing 50 comprises an inner bearing race 52, which is integrally formed with the input pinion 14, an outer bearing race 54, which is assembled to the housing assembly 12, and a plurality of bearing balls 56 that are received between the inner and outer bearing races 52 and 54. The outer bearing race 54 can be abutted against a shoulder 58 formed in a bore that forms at least a portion of the first cavity 40 in the first housing member 30. The seal mount 34 can abut an opposite end of the outer bearing race 54 and can be fixedly and sealingly coupled to the first housing member 30. A pinion shaft seal 60 can be mounted to the seal mount 34 and sealingly engage a shaft portion of the input pinion 14. The outer bearing race 54 is shown to be comprised of two discrete race members, but it will be appreciated that the outer bearing race 54 could be formed as a single piece. Moreover, while the first bearing 50 has been illustrated and described as being a four-point angular contact bearing, it will be appreciated that other types of bearings, including a tapered roller bearing, could be employed in the alternative.

The ring gear 16 can be meshingly engaged to a pinion gear 62 on the input pinion 14 and can be supported for rotation about a second axis 46 by a second bearing 64 that is configured to transmit axial loads between the ring gear 16 and the housing assembly 12 in two (i.e., opposite) directions along the second axis 46. Accordingly, it will be appreciated that the axial loads transmitted through the ring gear 16 are handled at least partly by the second bearing 64. In the example provided, the second bearing comprises an inner bearing race 66, which is assembled to the housing assembly 12, and an outer bearing race 68, which is integrally formed with the ring gear 16, and a plurality of bearing balls 70 that are received between the inner and outer bearing races 66 and 68.

The inner bearing race 66 can be received on a tubular projection 74 formed on the first housing member 30 and can abut a shoulder 76 that is formed by the intersection of the tubular projection 74 with a remainder of the first housing member 30. The annular bearing mount 36 can be engaged against an opposite side of the inner bearing race 66 and a plurality of threaded fasteners 77 can be received through the annular bearing mount 36 and threadably engaged to threaded holes formed in the tubular projection 74. It will be appreciated that various other means may be employed to secure the inner bearing race 66 to the tubular projection 74. For example, the tubular projection 74 could be threaded on its exterior diameter and a relatively large nut (not shown) could be threaded to the tubular projection 74 and abutted against the inner bearing race 66 so that the annular bearing mount 36 could be omitted. The inner bearing race 66 is shown to be comprised of two discrete race members, but it will be appreciated that the inner bearing race 66 could be formed as a single piece. Moreover, while the second bearing 64 has been illustrated and described as being a four-point angular contact bearing, it will be appreciated that other types of bearings, including a tapered roller bearing, could be employed in the alternative.

A third bearing 80 can be employed to provide additional stability to the input pinion 14. In the example provided, the third bearing 80 is disposed on an axial end of the input pinion 14 so that the pinion gear 62 of the input pinion 14 is disposed along the first axis at a location that is between the first and third bearings 50 and 80. While the third bearing 80 is illustrated as being a type of bearing that supports only radial loads (e.g., a roller bearing), it will be appreciated that a ball bearing, which could be configured to handle some loads directed axially along the first axis 42, could be employed in the alternative.

A fourth bearing (not shown) could be employed to provide additional stability to the ring gear 16. The fourth bearing can be a thrust bearing that can be disposed between the ring gear 16 and the housing assembly 12 at a location that is radially outward of the second bearing 64, such as a location that supports the teeth of the ring gear 16 to thereby resist deflection of the ring gear 16.

The differential assembly 18 can comprise a planetary gear arrangement that can have an internal gear 90, a planet carrier 92, a set of planet gears 94, and a sun gear 96. The internal gear 90 can be formed as an internally toothed, hollow sleeve and can be fixedly coupled to the ring gear 16 in any desired manner, such as welding.

The planet carrier 92 can comprise a carrier body 100 and a plurality of carrier pins 102. The carrier body 100 can comprise first and second carrier plates 104 and 106, respectively. The first carrier plate 104 can have an annular plate-like portion 110 and an annular wall member 112 that can extend from the annular plate-like portion 110 toward the ring gear 16. A thrust bearing 114 can be received in an annular pocket 116 formed in the ring gear 16 and can abut an axial end of the annular wall member 112 and an annular face of the pocket 116 formed on the ring gear 16. The second carrier plate 106 can include an annular plate-like portion 120. Each of the carrier pins 102 can be received through corresponding holes formed in the first and second carrier plates 104 and 106 can be coupled to the first and second carrier plates 104 and 106 in any desired manner. For example, the carrier pins 102 can be press-fit to the second carrier plate 106 and an internal snap ring 122 can be received into a slot 124 formed in each carrier pin 102 to thereby limit movement of the first carrier plate 104 on the carrier pins 102 in a direction away from the second carrier plate 106.

The set of planet gears 94 can be configured to transmit rotary loads between the internal gear 90 and the sun gear 96. In the example provided, the set of planet gears 94 comprises a plurality of planet gear pairs, with each planet gear pair having a first planet gear (not specifically shown), which can be meshingly engaged to the teeth of the internal gear 90, and a second planet gear 130 that is meshingly engaged to the teeth of the first planet gear and the teeth of the sun gear 96. Each of the first planet gears and the second planet gears 130 is journally supported on an associated one of the carrier pins 102 for rotation thereon.

The sun gear 96 can have a gear portion 138, which can be received in the carrier body 100, and an output portion 140 that can be received through the first carrier plate 104. The output portion 140 can be tubular in shape and a bearing 142, such as a roller bearing, can be employed to support the output portion 140 for rotation about the second axis 46 relative to the first housing member 30. The output portion 140 can comprise a plurality of internal spline teeth 144 that can be meshingly engaged to external spline teeth 146 formed on the first axle shaft 20. A snap ring or circlip 148 can be received in a groove 150 formed in first axle shaft 20; the circlip 148 can contact the axially inboard end of the internal spline teeth 144 in the output portion 140 to thereby limit movement of the first axle shaft 20 along the second axis 46 in a direction away from the sun gear 96.

The second axle shaft 22 can be received through the second housing member 32 and can be supported for rotation about the second axis 46 relative to the second housing member 32 by a bearing 150. A suitable bearing, such as a roller bearing 152, can be employed between the second carrier plate 106 and the second axle shaft 22 to support the second carrier plate 106 for rotation about the second axis 46.

Figure 2:
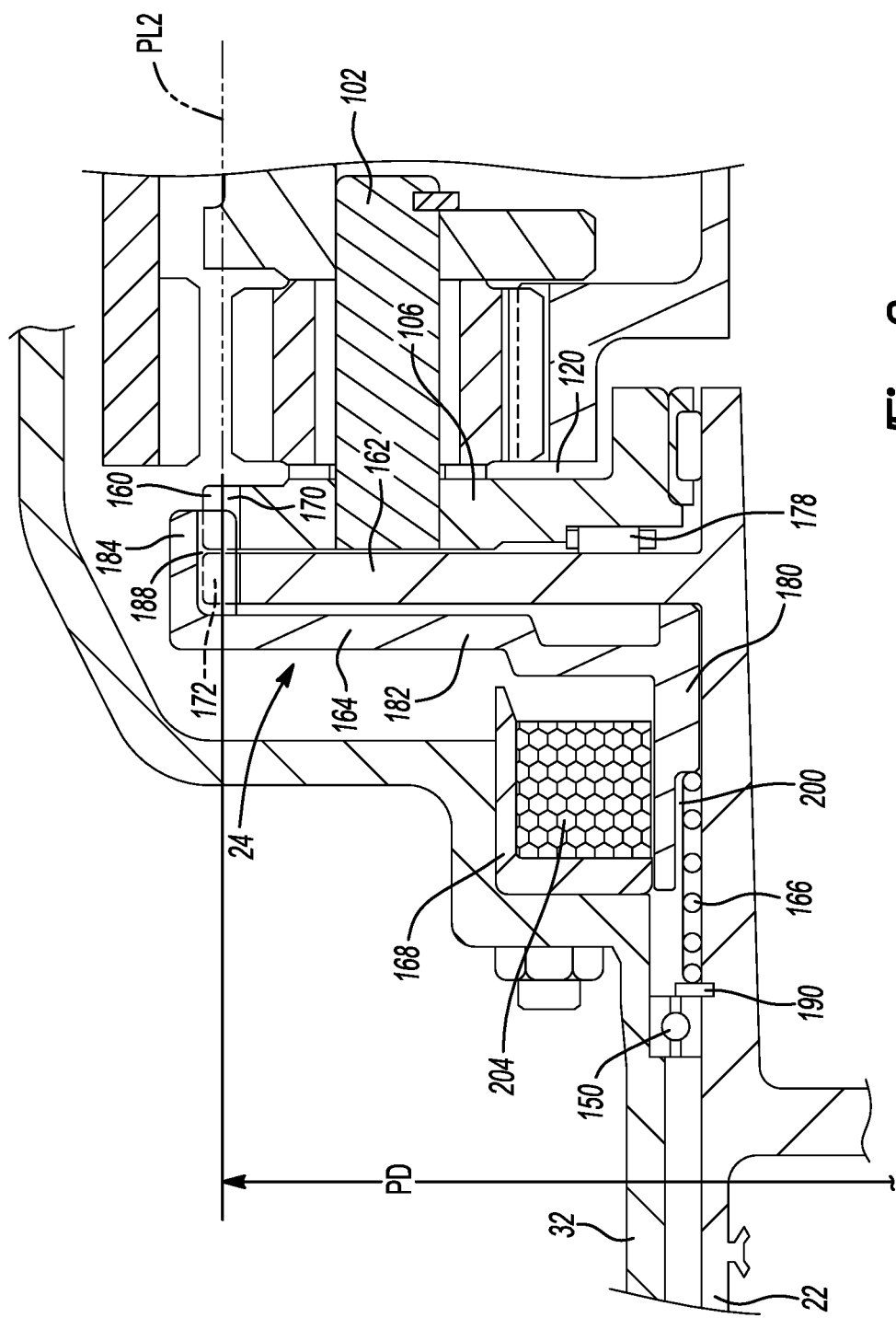
FIG. 2 is an enlarged portion of FIG. 1.
Figure 3:
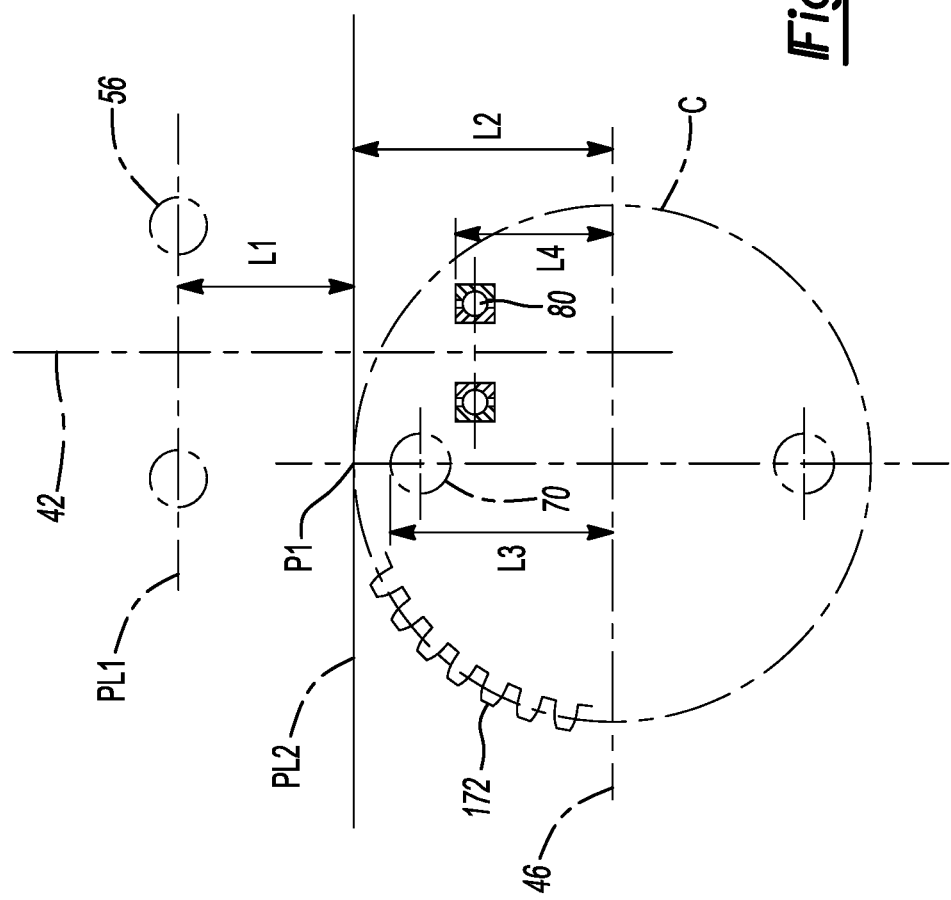
FIG. 3 is a schematic illustration depicting circles defined by the pitch diameters of teeth formed on a carrier body and a first output member in relation to various bearing elements and axes in the front axle assembly of FIG. 1.

With additional reference to FIG. 2, the coupling 24 can comprise a first coupling member 160, a second coupling member 162, a third coupling member 164, a biasing spring 166, and an actuator 168. The first coupling member 160 can be integrally formed with the second carrier plate 106 and can comprise a plurality of external teeth 170 that can be formed about the exterior periphery of the annular plate-like portion 120 of the second carrier plate 106. The second coupling member 162 can be an annular structure that can be fixedly coupled to the second axle shaft 22 and extend generally parallel to the second carrier plate 106. The second coupling member 162 can include a plurality of external teeth 172 about its exterior periphery. The external teeth 170 and the external teeth 172 can be formed as spline teeth having a 20 degree pressure angle and can have a common pitch diameter (PD), which can optionally be larger than: a) twice the radius (Da) from the center of any one of the carrier pins 102 to the second axis 46; b) twice the radius (Db) from the center of any one of the bearing balls 70 to the second axis 46; c) any portion of the output of the differential assembly 18 that is coupled to the first axle shaft for common rotation (e.g., the major diameter (Dc) of the sun gear 96 in the example provided); and/or d) a minimum diameter (Dd) of the ring gear 16. Additionally or alternatively, in the view of FIG. 3, the pitch diameter (PD) of the external teeth 170 and the external teeth 172 can be optionally sized such that circles defined by the pitch diameters are at least one of: a) have at least one point that is closer to a first plane PL1 extending through the centers of each of the bearing balls 56 that support the input pinion 14 than to the second axis 46 (point P1 on a circle C defined by the pitch diameter is spaced apart from a plane PL1 that extends through the centers of each of the bearing balls 56 that support the input pinion 14 by dimension L1; point P1 on circle C is spaced apart from the second axis by dimension L2; dimension L1 is smaller than dimension L2; b) have at least one point that is farther from the second axis 46 than any portion of a plurality of balls 70 of the second bearing 64 (point P1 on circle C is spaced from the second axis 46 by the dimension L2; dimension L3 is the maximum distance of the balls 70 of the second bearing 64 from the second axis 46; and the dimension L2 is greater than the dimension L3; c) have at least one point that is farther from the second axis 46 than any portion of the third bearing 80 (point P1 on circle C is spaced from the second axis 46 by the dimension L2; dimension L4 is the maximum distance of the third bearing 80 from the second axis 46; the dimension L2 is greater than the dimension L4; and/or d) tangent to a second plane PL2 that is perpendicular to and intersects the first axis 42 within a zone in which the teeth of the pinion gear 62 mesh with the teeth of the ring gear 16. A thrust bearing 178 can be received between the second carrier plate 106 and the second coupling member 162. The third coupling member 164 can be wholly or partly formed from a ferro-magnetic material and can include an annular hub 180, an annular flange 182 and a drum 184. The annular hub 180 can be received on the second axle shaft 22 for sliding movement thereon along the second axis 46. The annular flange 182 can be fixedly coupled to the annular hub 180 and can extend outwardly therefrom. The drum 184 can be fixedly coupled to the outer peripheral end of the annular flange 182 and can comprise a plurality of internal teeth 188 that can be meshed with the external teeth 172 of the second coupling member 162 and the external teeth 170 of the first coupling member 160.

The biasing spring 166 can be a helical compression spring that can be disposed concentrically about the second axle shaft 22 and can be abutted against an external snap ring 190, which can be mounted on the second axle shaft 22, and the third coupling member 164 to bias the third coupling member 164 along the second axis 46 toward the first coupling member 160 such that the internal teeth 188 of the drum 184 engage the external teeth 170 on the first coupling member 160. As such, the biasing spring 166 biases the third coupling member 164 along the second axis 46 into a position in which the third coupling member 164 is engaged to the first coupling member 160 (in addition to the second coupling member 162) so that rotary power can be transmitted between the planet carrier 92 and the second axle shaft 22. In the example provided, the biasing spring 166 is received into a counterbore 200 formed in the annular hub 180 of the third coupling member 164.

The actuator 168 can be configured to selectively move the third coupling member 164 along the second axis 46 in a direction away from the second planet carrier 92 to thereby disengage the internal teeth 188 of the drum 184 from the external teeth 170 of the first coupling member 160. In the example provided, the actuator 168 comprises an electromagnet 204 that is configured to generate a magnetic field that interacts with the ferro-magnetic material of the third coupling member 164 to cause the third coupling member 164 to move along the second axis 46 against the force of the biasing spring 166 by an appropriate distance to thereby disengage the internal teeth 188 of the drum 184 from the external teeth 170 of the first coupling member 160.

Moreover, the relatively large pitch diameter of the external teeth 170 of the first coupling member 160 permits the rotary load that is transmitted between the planet carrier 92 and the second axle shaft 22 to be distributed over a relatively large number of teeth. As a result, the load on any one tooth is relatively low and consequently, the depth of the external teeth 170 (i.e., the dimension of the external teeth 170 taken in a direction parallel to the second axis 46) on the first coupling member 160 (and the external teeth 170 on the second coupling member 162) can be relatively small, which permits the third coupling member 164 to have a relatively small stroke along the second axis 46, such as a stroke that is less than or equal to about 6.0 mm, preferably less or equal to about 5.0 mm and more preferably less than or equal to about 4.0 mm. In the particular example provided, the third coupling member 164 has a stroke that is less than or equal to about 3.0 mm.

While the coupling 24 has been described and illustrated as being "normally engaged" (i.e., capable of transmitting rotary power between the planet carrier 92 and the second axle shaft 22 when the actuator 168 is not actively powered), it will be appreciated that the coupling 24 could be configured as being "normally disengaged" (i.e., configured to disengage the third coupling member 164 from the first coupling member 160 when the actuator 168 is not actively powered so that rotary power is not transmitted between the planet carrier 92 and the second axle shaft 22). To facilitate "normally disengaged" operation, the biasing spring 166 could be positioned between the second and third coupling members 162 and 164 to bias the third coupling member 164 along the second axis 46 in a direction away from the first coupling member 160. With this alternative configuration, the biasing spring 166 biases the third coupling member 164 along the second axis 46 into a position in which the third coupling member 164 is disengaged from the first coupling member 160 (but not the second coupling member 162) so that rotary power cannot be transmitted between the planet carrier 92 and the second axle shaft 22. The electromagnet 204 can be selectively operated to generate a magnetic field, which can interact with the ferro-magnetic material of the third coupling member 164 to cause the third coupling member 164 to overcome the force of the biasing spring 166 and move along the second axis 46 to engage the internal teeth 188 of the drum 184 with the external teeth 170 of the first coupling member 160. The electromagnet 204 can be sized relatively small in diameter due to the relatively large pitch diameter of the external teeth 170, 172, which permits a relatively large number of turns of a small diameter wire to be employed so that a relatively strong magnetic field can be created with relatively little copper.

It will also be appreciated that the coupling 24 could be configured such that the third coupling member 164 is moveable into a third position in which it engages or locks to the internal gear 90 (to thereby inhibit speed differentiation between the first and second axle shafts 20 and 22) while the first and second coupling members 160 and 162 are coupled for rotation to one another. For example, external teeth could be formed on the drum 184 and could engage the internal teeth 188 of the internal gear 90 when the third coupling member 164 is positioned in the third position. As another example, the drum 184 could include a plurality of face teeth, which can extend from the drum 184 on a side opposite the annular flange 182; the face teeth can be selectively engaged to mating face teeth that can be formed on an axial end of the internal gear 90. It will be appreciated that the actuator 168 for the coupling 24 would need to be The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
an housing assembly;
an input pinion mounted to the housing assembly for rotation about a first axis;
a ring gear mounted to the housing assembly for rotation about a second axis that is not parallel to the first axis;
a differential assembly having an internal gear, a planet carrier, a plurality of planet gears, and a sun gear, the internal gear being coupled to the ring gear for rotation therewith, the planet carrier having a carrier body and a plurality of carrier pins that are fixedly coupled to the carrier body, each of the planet gears being iournally mounted on a corresponding one of the carrier pins, at least a first portion of the planet gears being meshed with the internal gear, at least a second portion of the planet gears being meshed with the sun gear;
a first output member;
a second output member coupled to the sun gear for rotation therewith; and
a clutch that is operable for selectively coupling the first output member to the carrier body;
wherein the clutch comprises a coupling member that is axially slidably mounted on the first output member; and
wherein the carrier body has a first set of external teeth, wherein the first output member has a second set of external teeth, and wherein the coupling member has at least one set of internal teeth that are engageable to the first and second sets of external teeth.

2. The axle assembly of claim 1, wherein the coupling member is movable along the second axis between a first position, in which the at least one set of internal teeth are engaged to both the first and second sets of external teeth, and a second position in which the at least one set of internal teeth are disengaged from the first set of external teeth.

3. The axle assembly of claim 2, wherein the first and second sets of external teeth have respective pitch diameters that are larger than at least one of:
a) twice a distance between the center of any one of the carrier pins to the second axis;

b) twice a distance from the second axis to a center of a rolling bearing element of a bearing that supports the ring gear for rotation on the housing assembly;
c) a major diameter of the sun gear; and
d) a minimum diameter of the ring gear.

4. The axle assembly of claim 1, wherein the first and second sets of external teeth have respective pitch diameters that are sized so that circles defined by the pitch diameters are at least one of:
a) have at least one point that is closer to a first plane extending through the centers of each of a plurality of bearing balls of a first bearing that support the input pinion than to the second axis;
b) have at least one point that is farther from the second axis than any portion of a plurality of balls of a second bearing that supports the ring gear for rotation relative to the housing assembly;
c) have at least one point that is farther from the second axis than any portion of a third bearing that supports the input pinion on a side of a pinion gear that is opposite the first bearing; and
d) tangent to a second plane that is perpendicular to and intersects the first axis within a zone in which the teeth of the pinion gear mesh with the teeth of the ring gear.

5. The axle assembly of claim 2, wherein the at least one set of internal teeth is engaged to the second set of external teeth when the coupling member is in the second position.

6. The axle assembly of claim 5, further comprising a spring that biases the coupling member toward the first position.

7. The axle assembly of claim 1, further comprising a linear actuator that is selectively operable for translating the coupling member in at least one direction along the second axis.

8. The axle assembly of claim 7, wherein the linear motor comprises an electromagnet.

9. The axle assembly of claim 1, further comprising a thrust bearing disposed between and contacting the first output member and the carrier body.

10. The axle assembly of claim 1, wherein at least one of the input pinion and the ring gear is supported for rotation relative to the housing assembly via a four-point angular contact bearing.

* * * * *

UNITED STATES PATENT AND TRADEMARK OFFICE
CERTIFICATE OF CORRECTION

PATENT NO. : 10,710,454 B2  
APPLICATION NO. : 16/024937  
DATED : July 14, 2020  
INVENTOR(S) : Paul J. Valente et al.

Page 1 of 1

It is certified that error appears in the above-identified patent and that said Letters Patent is hereby corrected as shown below:

In Column 8, In Line 39 of Claim 1, delete "iournally" and insert --journally-- therefor.

Signed and Sealed this  
Twenty-fifth Day of August, 2020

Andrei Iancu  
*Director of the United States Patent and Trademark Office*